United States Patent
Horenziak et al.

(10) Patent No.: US 6,706,410 B2
(45) Date of Patent: Mar. 16, 2004

(54) SOFT TISSUE PAPER HAVING A SOFTENING COMPOSITION CONTAINING A POLYSILOXANE-POLYALKYLENEOXIDE COPOLYMER

(75) Inventors: Steven Anthony Horenziak, Fairfield, OH (US); Ward William Ostendorf, West Chester, OH (US); Brian David Douglas, Fond Du Lac, WI (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/247,189

(22) Filed: Sep. 19, 2002

(65) Prior Publication Data

US 2003/0059579 A1 Mar. 27, 2003

Related U.S. Application Data

(60) Provisional application No. 60/324,307, filed on Sep. 24, 2001.

(51) Int. Cl.[7] .......................... B32B 15/04; D21H 11/00
(52) U.S. Cl. .................. 428/452; 428/153; 428/154; 428/156; 428/166; 428/172; 162/164.4
(58) Field of Search ................. 428/153, 154, 428/156, 166, 172, 447, 452; 162/109, 164.4

(56) References Cited

U.S. PATENT DOCUMENTS

| | | | | |
|---|---|---|---|---|
| 4,100,017 A | * | 7/1978 | Flautt | 428/154 |
| 4,426,466 A | * | 1/1984 | Schwartz | 428/537 |
| 4,481,243 A | * | 11/1984 | Allen | 428/154 |
| 4,950,545 A | | 8/1990 | Walter et al. | |
| 4,959,125 A | | 9/1990 | Spendel | |
| 5,059,282 A | | 10/1991 | Ampulski et al. | |
| 5,164,046 A | | 11/1992 | Ampulski et al. | |
| 5,215,626 A | | 6/1993 | Ampulski et al. | |
| 5,227,242 A | | 7/1993 | Walter et al. | |
| 5,246,546 A | | 9/1993 | Ampulski | |
| 5,397,435 A | | 3/1995 | Ostendorf et al. | |
| 5,538,595 A | | 7/1996 | Trokhan et al. | |
| 6,080,686 A | | 6/2000 | Floyd | |

FOREIGN PATENT DOCUMENTS

| | | |
|---|---|---|
| EP | 0 576 327 A2 | 12/1993 |
| WO | WO 02/81819 A1 | 10/2002 |

* cited by examiner

*Primary Examiner*—Donald J. Loney
(74) *Attorney, Agent, or Firm*—Stephen T. Murphy; David M. Weirich; Ken K. Patel

(57) ABSTRACT

Disclosed is a soft tissue paper product having two outer surfaces, the soft tissue paper product comprising one or more plies of a tissue paper having a total wet tensile strength of at least about 200 g/in; and a chemical softening composition deposited on at least one outer surface of said tissue, said chemical softening composition comprising a polysilicoxane-polyalkyleneoxide copolymer comprising greater than about 30% by weight of polyethyleneoxide macromonomer; wherein the copolymer has a surface tension of less than about 40 mN/m, has a Ross Miles foam height of less than about 60 mm, and has an HLB of greater than about 4.

12 Claims, No Drawings

SOFT TISSUE PAPER HAVING A SOFTENING COMPOSITION CONTAINING A POLYSILOXANE-POLYALKYLENEOXIDE COPOLYMER

CROSS REFERENCE TO RELATED APPLICATIONS

This application claims the benefit of U.S. Provisional Application No. 60/324,307, filed Sep. 24, 2001.

TECHNICAL FIELD

This invention relates to a soft tissue paper having the combination of softness, strength, absorbency and reopenability.

BACKGROUND OF THE INVENTION

Sanitary paper tissue products are widely used. Such items are commercially offered in formats tailored for a variety of uses such as facial tissues, toilet tissues and absorbent towels.

It has long been recognized that four important physical attributes of these products are their strength, their softness, their absorbency, and their lint resistance. Strength is the ability of the product to maintain physical integrity and to resist tearing, bursting and shredding under use conditions, particularly when wet. Softness is the tactile sensation perceived by the consumer as she holds a particular product, rubs it across her skin, or crumples it with her hand. Absorbency is the measure of the ability of a product to absorb quantities of liquid, particularly aqueous solutions or dispersions. Lint resistance is the ability of the fibrous product to bind together under use conditions, especially when wet. The literature is replete with examples of research and development efforts to improve one or more of these basic attributes, showing the delicacy of the balance of these attributes. A desire to improve a fifth physical attribute, while maintaining the high beneficial performance as to the other four attributes, dramatically adds to the complexity of the development process.

Despite this additional complexity, consumers continue to demand and appreciate additional benefits. One of these new physical attributes which creates a consumer benefit is the ease of reopening a paper tissue product once it is wet. This is especially true of more durable tissue products typically used for household cleaning, such as paper towels.

It is the object of the present invention to provide a tissue paper product with increased reopenability which has enhanced softness and which does not substantially sacrifice absorbency, strength, and lint resistance.

SUMMARY OF THE INVENTION

The present invention relates to a soft tissue paper product having two outer surfaces, the soft tissue paper product comprising:
  a) one or more plies of a tissue paper having a total wet tensile strength of at least about 200 g/in; and
  b) a chemical softening composition deposited on at least one outer surface of said tissue, said chemical softening composition comprising a silicoxane-polyalkyleneoxide copolymer comprising greater than about 10% by weight of polyalkyleneoxide;
  wherein the copolymer has a surface tension of less than about 40 mN/m at 0.1%, has a Ross Miles foam height of less than about 60 mm, and has an HLB of greater than about 4.

All percentages, ratios and proportions herein are by weight, unless otherwise specified.

All documents cited are, in relevant part, incorporated herein by reference; the citation of any document is not to be construed as an admission that it is prior art with respect to the present invention.

DETAILED DESCRIPTION OF THE INVENTION

The Soft Tissue Paper Product

The present invention provides a soft tissue paper product which has improved reopenability. The paper product comprises one or more plies of tissue paper and a chemical softening composition.

Tissue Paper

The present invention is applicable to tissue paper in general, including but not limited to: conventionally felt-pressed tissue paper; pattern, densified tissue paper, and high-bulk, uncompacted tissue paper. The tissue paper may be of a homogenous or multilayered construction; and tissue paper products made therefrom may be of a single-ply or multi-ply construction. The soft tissue paper product preferably has a basis weight of between about 10 $g/m^2$ and about 80 $g/m^2$, and density of about 0.60 g/cc or less. Preferably, the basis weight will range from about 20 $g/m^2$ to about 65 $g/m^2$ and more preferably from about 30 $g/m^2$ to about 50 $g/m^2$; and the density will be about 0.30 g/cc or less. Most preferably, the density will be between about 0.04 g/cc and about 0.20 g/cc.

Conventionally pressed tissue paper and methods for making such paper are known in the art. Such paper is typically made by depositing a papermaking furnish on a foraminous forming wire. This forming wire is often referred to in the art as a Fourdrinier wire. Once the furnish is deposited on the forming wire, it is referred to as a web. Overall, water is removed from the web by vacuum, mechanical pressing and thermal means. The web is dewatered by pressing the web and by drying at elevated temperature. The particular techniques and typical equipment for making webs according to the process just described are well known to those skilled in the art. In a typical process, a low consistency pulp furnish is provided in a pressurized headbox. The headbox has an opening for delivering a thin deposit of pulp furnish onto the Fourdrinier wire to form a wet web. The web is then typically dewatered to a fiber consistency of between about 7% and about 45% (total web weight basis) by vacuum dewatering and further dried by pressing operations wherein the web is subjected to pressure developed by opposing mechanical members, for example, cylindrical rolls. The dewatered web is then further pressed and dried by a stream drum apparatus known in the art as a Yankee dryer. Pressure can be developed at the Yankee dryer by mechanical means such as an opposing cylindrical drum pressing against the web. Multiple Yankee dryer drums may be employed, whereby additional pressing is optionally incurred between the drums. The tissue paper structures which are formed are referred to hereinafter as conventional, pressed, tissue paper structures. Such sheets are considered to be compacted, since the web is subjected to substantial overall mechanical compression forces while the fibers are moist and are then dried while in a compressed state. The resulting structure is strong and generally of singular density, but very low in bulk, absorbency and in softness.

Pattern densified tissue paper is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. Preferred processes for making pattern densified tissue webs are disclosed in U.S. Pat. No. 3,301,746, issued to Sanford and Sisson on Jan. 31, 1967, U.S. Pat. No. 3,974,025, issued to Ayers on Aug. 10, 1976, and U.S. Pat. No. 4,191,609, issued to Trokhan on Mar. 4, 1980, and U.S. Pat. No. 4,637,859, issued to Trokhan on Jan. 20, 1987.

In general, pattern densified webs are preferably prepared by depositing a papermaking furnish on a foraminous forming wire such as a Fourdrinier wire to form a wet web and then juxtaposing the web against an array of supports as it is transferred from the forming wire to a structure comprising such supports for further drying. The web is pressed against the array of supports, thereby resulting in densified zones in the web at the locations geographically corresponding to the points of contact between the array of supports and the wet web. The remainder of the web not compressed during this operation is referred to as the high-bulk field. This high-bulk field can be further dedensified by application of fluid pressure, such as with a vacuum type device or a blow-through dryer, or by mechanically pressing the web against the array of supports. The web is dewatered, and optionally predried, in such a manner so as to substantially avoid compression of the high-bulk field. This is preferably accomplished by fluid pressure, such as with a vacuum type device or blow-through dryer, or alternately by mechanically pressing the web against an array of supports wherein the high-bulk field is not compressed. The operations of dewatering, optional predrying and formation of the densified zones may be integrated or partially integrated to reduce the total number of processing steps performed. Subsequent to formation of the densified zones, dewatering, and optional predrying, the web is dried to completion, preferably still avoiding mechanical pressing. Preferably, from about 8% to about 65% of the tissue paper surface comprises densified knuckles, the knuckles preferably having a relative density of at least 125% of the density of the high-bulk field.

The structure comprising an array of supports is preferably an imprinting carrier fabric having a patterned displacement of knuckles which operate as the array of supports which facilitate the formation of the densified zones upon application of pressure. The pattern of knuckles constitutes the array of supports previously referred to. Imprinting carrier fabrics are disclosed in U.S. Pat. No. 3,301,746, issued to Sanford and Sisson on Jan. 31, 1967, U.S. Pat. No. 3,821,068, issued to Salvucci, Jr. et al. on May 21, 1974, U.S. Pat. No. 3,974,025, issued to Ayers on Aug. 10, 1976, U.S. Pat. No. 3,573,164, issued to Friedberg, et al. on Mar. 30, 1971, U.S. Pat. No. 3,473,576, issued to Amneus on Oct. 21, 1969, U.S. Pat. No. 4,239,065, issued to Trokhan on Dec. 16, 1980, and U.S. Pat. No. 4,528,239, issued to Trokhan on Jul. 9, 1985.

Preferably, the furnish is first formed into a wet web on a foraminous forming carrier, such as a Fourdrinier wire. The web is dewatered and transferred to an imprinting fabric. The furnish may alternately be initially deposited on a foraminous supporting carrier which also operates as an imprinting fabric. Once formed, the wet web is dewatered and, preferably, thermally predried to a selected fiber consistency of between about 40% and about 80%. Dewatering is preferably performed with suction boxes or other vacuum devices or with blow-through dryers. The knuckle imprint of the imprinting fabric is impressed in the web as discussed above, prior to drying the web to completion. One method for accomplishing this is through application of mechanical pressure. This can be done, for example, by pressing a nip roll which supports the imprinting fabric against the face of a drying drum, such as a Yankee dryer, wherein the web is disposed between the nip roll and drying drum. Also, preferably, the web is molded against the imprinting fabric prior to completion of drying by application of fluid pressure with a vacuum device such as a suction box, or with a blow-through dryer. Fluid pressure may be applied to induce impression of densified zones during initial dewatering, in a separate, subsequent process stage, or a combination thereof.

Uncompacted, non pattern-densified tissue paper structures are described in U.S. Pat. No. 3,812,000 issued to Joseph L. Salvucci, Jr. and Peter N. Yiannos on May 21, 1974, and U.S. Pat. No. 4,208,459, issued to Henry E. Becker, Albert L. McConnell, and Richard Schutte on Jun. 17, 1980. In general, uncompacted, non pattern-densified tissue paper structures are prepared by depositing a papermaking furnish on a foraminous forming wire such as a Fourdrinier wire to form a wet web, draining the web and removing additional water without mechanical compression until the web has a fiber consistency of at least 80%, and creping the web. Water is removed from the web by vacuum dewatering and thermal drying. The resulting structure is a soft but weak high-bulk sheet of relatively uncompacted fibers. Bonding material is preferably applied to portions of the web prior to creping.

The tissue paper of the soft tissue paper product of the present invention can also be uncreped tissue paper. Uncreped tissue paper, a term as used herein, refers to tissue paper which is non-compressively dried, most preferably by through air drying. Resultant through air dried webs are pattern densified such that zones of relatively high density are dispersed within a high bulk field, including pattern densified tissue wherein zones of relatively high density are continuous and the high bulk field is discrete. To produce uncreped tissue paper webs, an embryonic web is transferred from the foraminous forming carrier upon which it is laid, to a slower moving, high fiber support transfer fabric carrier. The web is then transferred to a drying fabric upon which it is dried to a final dryness. Such webs can offer some advantages in surface smoothness compared to creped paper webs.

The techniques to produce uncreped tissue in this manner are taught in the prior art. For example, Wendt, et. al. in European Patent Application 0 677 612A2, published Oct. 18, 1995 teaches a method of making soft tissue products without creping. In another case, Hyland, et. al. in European Patent Application 0 617 164 A1, published Sep. 28, 1994 teaches a method of making smooth uncreped through air dried sheets. Finally, Farrington, et. al. in U.S. Pat. No. 5,656,132 published Aug. 12, 1997 describes the use of a machine to make soft through air dried tissues without the use of a Yankee.

The papermaking fibers utilized for the present invention will normally include fibers derived from wood pulp. Other cellulosic fibrous pulp fibers, such as cotton linters, bagasse, etc., can be utilized and are intended to be within the scope of this invention. Synthetic fibers, such as rayon, polyethylene and polypropylene fibers, may also be utilized in combination with natural cellulosic fibers. One exemplary polyethylene fiber which may be utilized is Pulpex®, available from Hercules, Inc. (Wilmington, Del.).

Applicable wood pulps include chemical pulps, such as Kraft, sulfite, and sulfate pulps, as well as mechanical pulps including, for example, groundwood, thermomechanical pulp and chemically modified thermomechanical pulp.

Chemical pulps, however, are preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. Also applicable to the present invention are fibers derived from recycled paper, which may contain any or all of the above categories as well as other non-fibrous materials such as fillers and adhesives used to facilitate the original papermaking.

The tissue paper of the present invention may, optionally, comprise multiple plies or laminae of structures formed by the processes described above. These multiple laminae structures may be embosses for aesthic reasons, to maintain the laminae in face-to-face relation as the laminate is used, or to provide spacing between the laminae. Any embossment technology known in the art may be applied to the tissue paper of the present invention. Much of this technology is discussed in U.S. Pat. No. 5,294,475, issued to McNeil on Mar. 15, 1994, including knob-to-knob embossing, nesting embossing, and offset embossing where embossment on one outer surface projects to a nonembossed region of the other outer surface. A particularly, preferred embodiment of the present invention comprises at least one ply of tissue, where each of the two outer plies comprises a nonembossed region and embossments, such that the embossments project towards the other ply at a nonembossed region.

Total Wet Tensile Strength

The tissue paper of the paper product of the present invention may be any combination of one or more plies of the paper compositions described above to form a sheet or roll paper product. The paper product produced to have two outer surfaces, a first, top surface and a second, bottom surface. The paper composition and making process must be selected to create tissue paper which has a total wet tensile strength of greater than about 200 g/in, preferably greater than about 350 g/in. It has been found that the reopenablity benefit of the present invention is not achieved using paper having a lower wet tensile strength. Wet tensile strength is measured in the machine direction (MD) and cross-machine direction (CD) according to ASTM D829-49. Total wet tensile strength is the value of the sum of the MD and CD measurements. The samples are tested at least 2 weeks after manufacture or are "aged" for 5 minutes at 105° C. before testing.

Additional permanent wet tensile strength can be achieved by adding compounds from the group of chemicals including polyamide-epichlorohydrin, polyacrylamides, styrene-butadiene lattices; insolubilized polyvinyl alcohol; urea-formaldehyde; polyethyleneimine; chitosan polymers and mixtures thereof to the papermaking furnish or to the embryonic web. Preferred resins are cationic wet strength resins, such as polyamide-epichlorohydrin resins. Suitable types of such resins are described in U.S. Pat. Nos. 3,700,623, issued on Oct. 24, 1972, and U.S. Pat. No. 3,772,076, issued on Nov. 13, 1973, both to Keim. One commercial source of useful polyamide-epichlorohydrin resins is Hercules, Inc. of Wilmington, Del., which markets such resin under the mark Kymene 557H®.

Optional Chemical Additives

Other materials can be added to the aqueous papermaking furnish or the embryonic web to impart other desirable characteristics to the product or improve the papermaking process so long as they are compatible with the chemistry of the softening composition and do not significantly and adversely affect the softness or strength character of the present invention. The following materials are expressly included, but their inclusion is not offered to be all-inclusive. Other materials can be included as well so long as they do not interfere or counteract the advantages of the present invention.

It is common to add a cationic charge biasing species to the papermaking process to control the zeta potential of the aqueous papermaking furnish as it is delivered to the papermaking process. These materials are used because most of the solids in nature have negative surface charges, including the surfaces of cellulosic fibers and fines and most inorganic fillers. One traditionally used cationic charge biasing species is alum. More recently in the art, charge biasing is done by use of relatively low molecular weight cationic synthetic polymers preferably having a molecular weight of no more than about 500,000 and more preferably no more than about 200,000, or even about 100,000. The charge densities of such low molecular weight cationic synthetic polymers are relatively high. These charge densities range from about 4 to about 8 equivalents of cationic nitrogen per kilogram of polymer. An exemplary material is Cypro 514®, a product of Cytec, Inc. of Stamford, Conn. The use of such materials is expressly allowed within the practice of the present invention.

The use of high surface area, high anionic charge microparticles for the purposes of improving formation, drainage, strength, and retention is taught in the art. See, for example, U.S. Pat. No. , 5,221,435, issued to Smith on Jun. 22, 1993. Common materials for this purpose are silica colloid, or bentonite clay. The incorporation of such materials is expressly included within the scope of the present invention.

Many paper products must have limited strength when wet because of the need to dispose of them through toilets into septic or sewer systems. If wet strength is imparted to these products, fugitive wet strength, characterized by a decay of part or all of the initial strength upon standing in presence of water, is preferred. If fugitive wet strength is desired, the binder materials can be chosen from the group consisting of dialdehyde starch or other resins with aldehyde functionality such as Co-Bond 1000® offered by National Starch and Chemical Company of Scarborough, Me.; Parez 750® offered by Cytec of Stamford, Conn.; and the resin described in U.S. Pat. No. 4,981,557, issued on Jan. 1, 1991, to Bjorkquist, and other such resins having the decay properties described above as may be known to the art.

If enhanced absorbency is needed, surfactants may be used to treat the tissue paper webs of the present invention. The level of surfactant, if used, is preferably from about 0.01% to about 2.0% by weight, based on the dry fiber weight of the tissue web. The surfactants preferably have alkyl chains with eight or more carbon atoms. Exemplary anionic surfactants include linear alkyl sulfonates and alkylbenzene sulfonates. Exemplary nonionic surfactants include alkylglycosides including alkylglycoside esters such as Crodesta SL-40® which is available from Croda, Inc. (New York, N.Y.); alkylglycoside ethers as described in U.S. Pat. No. 4,011,389, issued to Langdon, et al. on Mar. 8, 1977; and alkylpolyethoxylated esters such as Pegosperse 200 ML available from Glyco Chemicals, Inc. (Greenwich, Conn.) and IGEPAL RC-520® available from Rhone Poulenc Corporation (Cranbury, N.J.). Alternatively, cationic softener active ingredients with a high degree of unsaturated (mono and/or poly) and/or branched chain alkyl groups can greatly enhance absorbency.

While the essence of the present invention is the presence of a softening agent composition deposited on the tissue web surface, the invention also expressly includes variations in which chemical softening agents are added as a part of the papermaking process. For example, chemical softening agents may be included by wet end addition. Preferred chemical softening agents comprise quaternary ammonium compounds including, but not limited to, the well-known dialkyldimethylammonium salts (e.g., ditallowdimethylammonium chloride, ditallowdimethylammonium methyl sulfate, di(hydrogenated tallow)dimethyl ammonium chloride, etc.). Particularly preferred variants of these softening agents include mono or diester variations of the before mentioned dialkyldimethylammonium salts and ester quaternaries made from the reaction of fatty acid and either methyl diethanol amine and/or triethanol amine, followed by quaternization with methyl chloride or dimethyl sulfate.

Another class of papermaking-added chemical softening agents comprise the well-known organo-reactive polydimethyl siloxane ingredients, including the most preferred amino functional polydimethyl siloxane.

Filler materials may also be incorporated into the tissue papers of the present invention. U.S. Pat. No. 5,611,890, issued to Vinson et al. on Mar. 18, 1997 discloses filled tissue paper products that are acceptable as substrates for the present invention.

The above listings of optional chemical additives is intended to be merely exemplary in nature, and are not meant to limit the scope of the invention.

Chemical Softening Composition

In general, the softening composition of the present invention comprises a polysiloxane-polyalkyleneoxide copolymer. When applied to tissue paper as described herein, such compositions are effective in softening the tissue paper. However, this selection of compounds further provides the reopenability benefit of the present invention. Preferably, the softening composition of the present invention has properties (e.g., ingredients, rheology, pH, etc.) permitting easy application thereof on a commercial scale. For example, while certain volatile organic solvents may readily dissolve high concentrations of effective softening materials, such solvents are not desired because of the increased process safety and environmental burden (VOC) concerns raised by such solvents.

It has been unexpectedly found that by using a copolymer of polysiloxane and polyalkyleneoxide, the resulting soft tissue paper product provides a more preferable combination of reopenability, softness, strength, absorbency and lint resistance than by using separate polysiloxane compounds and/or alkyleneoxide surfactants known in the art.

The polysiloxane-polyalkyleneoxide copolymer, also known in the art as a silicone copolyols, useful in the present invention include polymeric, oligomeric, copolymeric and other multiple monomeric siloxane materials. The copolymers generally comprise a polysiloxane backbone comprised of siloxane units, and polyalkyleneoxide sidechains. The polysiloxane backbone can be either straight chain, branched chain or cyclic in structure. The polyalkyleneoxide sidechain of copolymers of the present invention may comprise polyethyleneoxide, polypropyleneoxide, polybutyleneoxide macromonomers, or mixtures thereof. The side chains may also optionally comprise polyethylene, polypropylene, polybutylene monomers. Preferably, polyalkyleneoxide monomer comprises greater than about 10%, preferably greater than about 20%, and more preferably greater than about 30% by weight of the copolymer. Polyethyleneoxide sidechain macromonomers are preferred. Also, preferred are polypropyleneoxide sidechains, and sidechains comprising polyethyleneoxide and polypropylene oxide at a mole ratio of from about 1:2 to about 2:1.

The copolymers of the present invention typically have a molecular weight ranging from about 2,000 to about 100,000 g/g-mole, preferably from about 10,000 to about 80,000 g/g-mole, more preferably from about 15,000 to about 75,000, even more preferably from about 20,000 to about 50,000, and most preferably from about 25,000 to about 40,000.

The polysiloxane-polyalkyleneoxide copolymers of the present invention have a surface tension of less than about 40 mN/m, preferably less than about 30 mN/m, and more preferably less than about 25 mN/m. The surface tension is measured by the Wilhelmy plate test method according to ASTM D1331-89 using a 0.1% by weight solution at 25° C. The copolymers of the present invention also have a Ross Miles foam height of less than about 60 mm, preferably less than about 40 mm, more preferably less than about 40 mm, and most preferably less than about 10 mm. The Ross Miles foam height test is performed according to ASTM C1173-53 using 1% by weight solutions and taking 5 minute readings. Additionally, the copolymers of the present invention have an HLB greater than or equal to about 4, preferably greater than or equal to about 6, and more preferably greater than or equal to about 8.

Preferably, the polysiloxane-polyalkyleneoxide copolymer has the general formula:

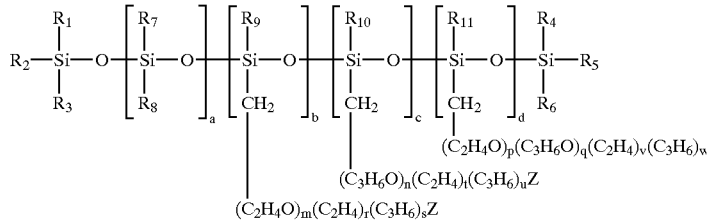

wherein each of the $R_1$–$R_{11}$ radical can independently be selected from the group consisting of $C_1$–$C_{10}$ unsubstituted alkyl or aryl groups; hydrogen bonding functional groups such as amino, carboxyl, hydroxyl, ether, polyether, aldehyde, ketone, amide, ester and thiol groups; or cellulose bonding groups such as epoxide groups; self-cross linking groups; $C_1$–$C_{10}$ alkyl or aryl groups substituted with hydrogen bonding functional groups, cellulose bonding groups or self-cross linking groups, or mixtures thereof. Preferably each $R_1$–$R_{11}$ radical is independently any $C_1$–$C_4$ unsubstituted alkyl group, a hydroxyl group, an epoxide group or mixtures thereof. Z can be any monomer endcap known in the art, such as hydrogen or any $C_1$–$C_4$ unsubstituted alkyl group.

As one skilled in the art of polymer chemistry knows, the makeup of polymers are random combinations of the monomer and macromonomer such that the average polymer comprises desired overall, backbone and side chain molecular weights, siloxane backbone to alkyleneoxide side chain ratios, and sidechain composition. In general, a can range from 1 to 1000, preferably from 2 to 500, more preferably from 5 to 250, and most preferably from 10 to 100. b and d can range from 0 to 500, preferably from 0 to 250, more preferably from 0 to 100. c can range from 0 to 50, preferably from 0 to 20, more preferably from 0 to 10. m, n, and p can independently range from 0 to 100, preferably from 1 to 75, more preferably from 2 to 50, even more preferably from 5 to 30. r, s, t, u, v, and w each can independently range from 0 to 10, preferably from 0 to 7, more preferably from 0 to 5.

As can be seen in the general formula, the preferred copolymer comprises a backbone of siloxane monomers and side chains of polyethylene macromonomer, polypropylene macromonomer, or polyethylene-propylene macrocomonomer. In one preferred embodiment the side chains are essentially polyethyleneoxide macromonomers. That is to say the mole ratio of (c+d):(a+b+c+d) is less than about 0.05, preferably less than about 0.02, more preferably less than about 0.01, and most preferably equal to 0. In this embodiment the mole ratio of a to b are determined such that the polyethyleneoxide macromonomer comprises at least 20% and preferably at least 30% of the weight of the copolymer. Lower levels can be used in applications where lower levels of absorbency are desired.

In another preferred embodiment, the side chains comprise macromonomer which are predominantly a mix of ethyleneoxide and propylene oxide monomers. That is the mole ratio of (b+c): (a+b+c+d) is less than about 0.05, preferably less than about 0.02, more preferably less than about 0.01, and most preferably equal to 0. In this embodiment the mole ratio of p:q is greater than 0.8, preferably greater than 0.9, more preferably greater than 0.95, and most preferably greater than 0.99. Again, preferably the mole ratio of a to d are determined such that the polyethyleneoxide-propyleneoxide macromonomer comprises at least 10%, preferably at least 20%, and more preferably at least 30% of the weight of the copolymer.

In all embodiments it is preferred, but not required, to keep the mole ratio c:(a+b+c+d) less than 0.1, preferably less than 0.05, more preferably less than 0.01, and most preferably equal to 0.

While the side chains are intended to be predominantly comprised of the polyalkyleneoxide monomers, side chains also having low levels of ethylene or propylene monomers may be used in the present invention. Preferably the mole ratios of m:(m+r+s), n:(n+t+u), and (p+q):(p+q+v+w) are all greater than about 0.9, more preferably greater than about 0.95, and most preferably equal to 1.0.

Preferred copolymers of the present invention include, but are not limited to Silwet L-7602™, Silwet L-7650™, Silwet L-8610™, Silwet L-8600™, Silwet L-7604™, Silwet L-7644™, Silwet L-77™, Silwet L-7608™, Nuwet 550™, Nuwet 100™, and Nuwet 625™, all available from OSI Specialties, Inc.; DC 190™, DC 193™, and Q2-5211™ available from Dow Corning, Midland, Mich.; and EBP-234™ available from Gelest. Mixtures of copolymer can also be used in the present invention.

A vehicle may be used to dilute the copolymer of the softening compositions described herein. A vehicle may dissolve such components (true solution or micellar solution) or such components may be dispersed throughout the vehicle (dispersion or emulsion). The vehicle of a suspension or emulsion is typically the continuous phase thereof. That is, other components of the dispersion or emulsion are dispersed on a molecular level or as discrete particles throughout the vehicle.

For purposes of the present invention, one purpose that the vehicle serves is to dilute the concentration of softening active ingredients so that such ingredients may be efficiently and economically applied to a tissue web. For example, as is discussed below, one way of applying such copolymers is to spray them onto a roll which then transfers the active ingredients to a moving web of tissue. Typically, only very low levels (e.g. on the order of 2% by weight of the associated tissue) of copolymers are required to effectively provide the reopenability and softness of the present invention. This means very accurate metering and spraying systems would be required to distribute a "pure" softening active ingredient across the full width of a commercial-scale tissue web.

While softening ingredients can be dissolved in a vehicle forming a solution therein, materials that are useful as solvents for suitable softening active ingredients are not commercially desirable for safety and environmental reasons. Therefore, to be suitable for use in the vehicle for purposes of the present invention, a material should be compatible with the copolymers described herein and with the tissue substrate on which they will be deposited. Further a suitable material should not contain any ingredients that create safety issues (either in the tissue manufacturing process or to users of tissue products using the softening compositions described herein) and not create an unacceptable risk to the environment. Suitable materials for the vehicle of the present invention include hydroxyl functional liquids most preferably water.

Minor Components of the Softening Composition

The vehicle can also comprise minor ingredients as may be known to the art. Examples include: mineral acids or buffer systems for pH adjustment (may be required to maintain hydrolytic stability for certain softening active ingredients) and antifoam ingredients (e.g., a silicone emulsion as is available from Dow Corning, Corp. of Midland, Mich. as Dow Corning 2310) as a processing aid to reduce foaming when the softening composition of the present invention is applied to a web of tissue. Also, superwetting agents, such as Q2-5211 from Dow Corning, may be included as a minor ingredient to aid spreading of the softening compostion.

It may also be desirable to provide means to control the activity of undesirable microorganisms in the softening composition of the present invention. It is known that organisms, such as bacteria, molds, yeasts, and the like, can cause degradation of the composition on storage. Undesirable organisms can also potentially transfer to users of tissue paper products that are softened with a composition according to the present invention that is contaminated by such organisms. These undesirable organisms can be controlled by adding an effective amount of a biocidal material to the softening composition. Proxel GXL, as is available from Avecia, Inc. of Wilmington, Del., has been found to be an effective biocide in the composition of the present invention when used at a level of about 0.1%. Alternatively, the pH of the composition can be made more acid to create a more hostile environment for undesirable microorganisms. Means such as those described above can be used to adjust the pH to be in a range of between about 2.5 to 4.0, preferably between about 2.5 and 3.5, more preferably between about 2.5 and about 3.0 so as to create such a hostile environment.

Stabilizers may also be used to improve the uniformity and shelf life of the dispersion. For example, an ethoxylated polyester, HOE S 4060, available from Clariant Corporation of Charlotte, N.C. may be included for this purpose.

Process aids may also be used, including for example, a brightener, such as Tinopal CBS-X, obtainable from CIBA- GEIGY of Greensboro, N.C. may be added to the dispersion to allow easy qualitative viewing of the application uniformity, via inspection of the finished tissue web, containing a surface-applied softening composition, under UV light.

Forming the Softening Composition

As noted above, the softening composition of the present invention is a solution or dispersion of the polysiloxane-polyalkyleneoxide copolymer in a vehicle. Depending on the copolymer chosen, the desired application level and other factors as may require a particular level of copolymer in the composition, the level of copolymer may vary between about 1% of the composition and about 30% of the composition. Preferably, the softening active ingredient comprises between about 5% and about 20% of the composition, most preferably between about 10% and about 15% of the composition. The following describes preparation of a particularly preferred softening composition of the present invention.

Application Method

In one preferred embodiment, the softening composition of the current invention may be applied after the tissue web has been dried and creped, and, more preferably, while the web is still at an elevated temperature. Preferably, the softening composition is applied to the dried and creped tissue web before the web is wound onto the parent roll. Thus, in a preferred embodiment of the present invention the softening composition is applied to a hot, overdried tissue web after the web has been creped and after the web has passed through the calender rolls which control the caliper. Still more preferably, the composition is applied only to a side of the web that does not contact any rolls between the calendar rolls and the winder.

The softening composition described above is preferably applied to the web in a macroscopically uniform fashion so that substantially the entire sheet benefits from the effect of the softening composition. Following application to the hot web, at least a portion of the volatile components of the vehicle preferably evaporates leaving preferably a thin film containing any remaining unevaporated portion of the volatile components of the vehicle, the softening active ingredient, and other nonvolatile components of the softening composition. By "thin film" is meant any thin coating, haze or mist on the on the web. This thin film can be microscopically continuous or be comprised of discrete elements. If the thin film is comprised of discrete elements, the elements can be of uniform size or varying in size; further they may be arranged in a regular pattern or in an irregular pattern, but macroscopically the thin film is uniform. Preferably the thin film is composed of discrete elements.

The softening composition can be added to either side of the tissue web singularly, or to both sides. Preferably, the composition is applied only to a side of the web that does not contact any rolls between the calendar rolls and the parent roll.

Any known method of macroscopically uniformly applying the softening composition to the web may be used. These include, but are not limited to gravure printing, extrusion and spraying. The dispersed softening composition is applied onto the dried, creped tissue web after the Yankee dryer and before the parent roll. A particularly convenient means of accomplishing this application is to apply the softening composition to the web after the calendar rolls and before the parent roll. A particularly preferred application position is between the calendar rolls and any spreading roll that may be positioned between the calendar rolls and the parent roll. Such position is particularly preferred because the web is controlled by rolls at each end of the span where the composition is applied and there is still some web path length before the web is wound onto the parent roll for volatilization of the vehicle.

Suitably, the softening composition is disposed at a level of between about 0.1% and about 8% of the weight of the paper sheet 15, preferably between about 0.1% and about 5%, more preferably between about 0.1% and about 3%.

While not wishing to be bound by theory or to otherwise limit the present invention, the following description of typical process conditions encountered during the papermaking operation and their impact on the process described in this invention is provided. The Yankee dryer raises the temperature of the tissue sheet and removes the moisture. The steam pressure in the Yankee is on the order of 110 PSI (750 kPa). This pressure is sufficient to increase the temperature of the cylinder to about 170° C. The temperature of the paper on the cylinder is raised as the water in the sheet is removed. The temperature of the sheet as it leaves the doctor blade can be in excess of 120° C. The sheet travels through space to the calender and the reel and loses some of this heat. The temperature of the paper wound in the reel is measured to be on the order of 60° C. Eventually the sheet of paper cools to room temperature. This can take anywhere from hours to days depending on the size of the paper roll. As the paper cools it also absorbs moisture from the atmosphere.

Since the softening composition of the present invention is applied to the paper while it is overdried, the water added to the paper with the softening composition by this method (i.e. residual water that does not evaporate in the span between spreading roll 9 and reel 12) is not sufficient to cause the paper to lose a significant amount of its strength and thickness. Thus, no further drying is required.

In another embodiment, the softening compositions applied to a 2-ply web, after lamination, by a gravure coater, slot extruder, or by spraying. By applying the softening compositions after lamination, any interference of the composition with the lamination glue is minimized.

EXAMPLES

Example 1

This Example illustrates preparation of tissue paper exhibiting one embodiment of the present invention. This example demonstrates the production of homogeneous tissue paper webs that are provided with a preferred embodiment of the softening composition of the present invention made as described above. The composition is applied to one side of the web and the webs are combined into a two-ply paper towel product.

A pilot scale Fourdrinier papermaking machine is used in the practice of the present invention.

An aqueous slurry of NSK of about 3% consistency is made up using a conventional repulper and is passed through a stock pipe toward the headbox of the Fourdrinier.

In order to impart temporary wet strength to the finished product, a 2% dispersion of Kymene LX® is prepared and is added to the NSK stock pipe at a rate sufficient to deliver 1.8% Kymene® based on the dry weight of the NSK fibers. The absorption of the wet strength resin is enhanced by passing the treated slurry through an in-line mixer. A solution of 1% carboxymethyl cellulose is then added to the NSK fibers to deliver 0.4% by wiehgt to the NSK fibers.

An aqueous slurry of CTMP fibers of about 2% by weight is made up using a conventional repulper. The stock pipe carrying eucalyptus fibers is treated with an anionic surfactant, Igepal RC-520®, which is delivered as a 1% dispersion in water and at a rate of 0.05% based on the finished dry weight of the resultant creped tissue product.

The stream of NSK fibers and CTMP fibers are then combined in a single stock pipe prior to the inlet of the fan pump. The combined NSK fibers and CTMP fibers are then diluted with white water at the inlet of a fan pump to a consistency of about 0.2% based on the total weight of the NSK fibers and CTMP fibers.

The homogeneous slurry of NSK fibers and CTMP fibers are directed into a multi-channeled headbox suitably equipped to maintain the homogeneous stream until discharged onto a traveling Fourdrinier wire. The homogeneous slurry is discharged onto the traveling Fourdrinier wire and is dewatered through the Fourdrinier wire and is assisted by a deflector and vacuum boxes.

The embryonic wet web is transferred from the Fourdrinier wire, at a fiber consistency of about 15% at the point of transfer, to a patterned drying fabric. The drying fabric is designed to yield a pattern densified tissue with discontinuous low-density deflected areas arranged within a continuous network of high density (knuckle) areas. This drying fabric is formed by casting an impervious resin surface onto a fiber mesh supporting fabric. The supporting fabric is a 70×35 filament. The thickness of the resin cast is about 14 mil above the supporting fabric. The knuckle area is about 25% and the open cells remain at a frequency of about 240 per square inch.

Further dewatering is accomplished by vacuum assisted drainage until the web has a fiber consistency of about 26%.

While remaining in contact with the patterned forming fabric, the patterned web is predried by air blow-through predryers to a fiber consistency of about 62% by weight.

The semi-dry web is then transferred to the Yankee dryer and adhered to the surface of the Yankee dryer with a sprayed creping adhesive comprising a 0.125% aqueous solution of polyvinyl alcohol. The creping adhesive is delivered to the Yankee surface at a rate of 0.1% adhesive solids based on the dry weight of the web.

The fiber consistency is increased to about 96% before the web is dry creped from the Yankee with a doctor blade.

The doctor blade has a bevel angle of about 25 degrees and is positioned with respect to the Yankee dryer to provide an impact angle of about 81 degrees. The Yankee dryer is operated at a temperature of about 350° F. (177° C.) and a speed of about 800 fpm (feet per minute) (about 244 meters per minute).

The web is then passed between two calender rolls. The two calender rolls are biased together at roll weight and operated at surface speeds of 720 fpm (about 200 meters per minute) which produces a percent crepe of about 10%. The web is wound onto parent rolls and sent to a converting line, where it is laminated into a 2-ply product using polyvinyl alcohol glue. The tissue product is then passed through a gravure coater where a Nuwet solution is applied.

The coater applies a 50% (v/v) solution of Nuwet 550, prepared by mixing 25 gallons of copolymer with 25 gallons of tap water. The solution is fed into two gravure pans in contact with rotating, smooth gravure cylinders. The copolymer solution is re-circulated. The temperature of the solution is not regulated. Each gravure cylinder is in contact with an applicator roll. The two applicator rolls form a nip through which a two-ply web with a total wet tensile strength of about 500 g/in is passed.

The gravure coater is operated according to normal methods so that the add-on rate is less than 1% copolymer based on dry weight of the paper. The resultant 2-ply web is then converted into paper towels. The towels treated according to this invention exhibit superior softness, reopenability and wet bulk feel compared to untreated towels, without reduced absorbent rate or capacity.

The web is converted into a homogeneous, creped patterned densified tissue paper product. The resulting treated tissue paper has an improved tactile sense of softness relative to the untreated control, and improved wet reopenability.

What is claimed is:

1. A soft tissue paper product having two outer surfaces, the soft tissue paper product comprising:
   a) one or more plies of a tissue paper having a total wet tensile strength of at least about 200 g/in; and
   b) a chemical softening composition deposited on at least one outer surface of said tissue, said chemical softening composition comprising a polysiloxane-polyalkyleneoxide copolymer;
   wherein the copolymer has a surface tension of less than about 40 mN/m, has a Ross Miles foam height of less than about 60 mm, and has an HLB of greater than about 4.

2. A soft tissue paper product according to claim 1 wherein the polysiloxane-polyalkyleneoxide copolymer comprises greater than about 10% by weight of polyalkyleneoxide monomer.

3. A soft tissue paper product according to claim 2 wherein the polysiloxane-polyalkyleneoxide copolymer has a molecular weight ranging from about 2,000 g/g-mole to about 100,000 g/g-mole.

4. A soft tissue paper product according to claim 3 wherein the copolymer comprises a polysiloxane backbone and polyalkyleneoxide sidechains.

5. A soft tissue paper product according to claim 4 wherein the polysiloxane-polyalkyleneoxide copolymer has the formula:

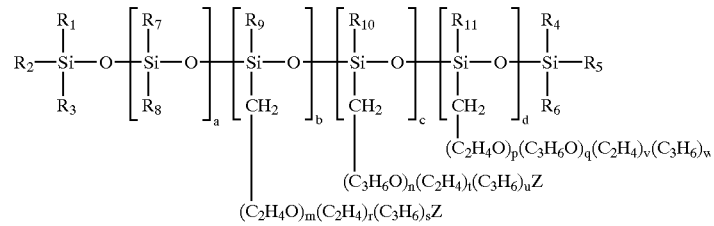

wherein each of the $R_1$ to $R_{11}$ radical is independently selected from the group consisting of $C_1$–$C_{10}$ unsubstituted alkyl or aryl groups, hydrogen bonding functional groups, cellulose bonding groups, self-cross linking groups; Z is a capping group selected from the group consisting of hydrogen and $C_1$–$C_4$ unsubstituted alkyl groups; a is any integer ranging from 1 to 1000; b and d are independently any, integer ranging from 0 to 500; c is any integer ranging from 0 to 50; m, n, and p are independently any integer ranging from 0 to 100; and r, s, t, u, v, and w are independently any integer ranging from 0 to 10.

6. A soft tissue paper product according to claim 5 wherein the mole ratio of m:(m+r+s) is greater than about 0.9, the mole ratio of n:(n+t+u) is greater than about 0.9, and the mole ratio of (p+q):(p+q+v+w) is greater than about 0.9.

7. A soft tissue paper product according to claim 6 wherein the mole ratio of (c+d):(a+b+c+d) is less than about 0.05.

8. A soft tissue paper product according to claim 7 wherein the polyethyleneoxide macromonomer comprises greater than about 10% by weight of the copolymer.

9. A soft tissue paper product according to claim 6 wherein the mole ratio of (b+c):(a+b+c+d) is less than about 0.05.

10. A soft tissue paper product according to claim 9 wherein the mole ratio of p:q is greater than 0.8.

11. A soft tissue paper product according to claim 2 wherein the tissue paper comprises more than one ply, wherein at least one of the outer surfaces is embossed.

12. A soft tissue paper product according to claim 11 wherein each of the two plies comprises a nonembossed region and embossed sites, wherein the embossments of one ply projects toward the nonembossed region of the other ply.

* * * * *